(12) United States Patent
Geckeler

(10) Patent No.: US 9,403,122 B2
(45) Date of Patent: *Aug. 2, 2016

(54) VOC SOURCE REMOVAL AND OFF GAS PURIFICATION SYSTEM

(76) Inventor: Grant Geckeler, Corona, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/240,721

(22) PCT Filed: Oct. 20, 2011

(86) PCT No.: PCT/US2011/057077
§ 371 (c)(1),
(2), (4) Date: Mar. 3, 2014

(87) PCT Pub. No.: WO2013/025230
PCT Pub. Date: Feb. 21, 2013

(65) Prior Publication Data
US 2014/0373712 A1 Dec. 25, 2014

Related U.S. Application Data

(63) Continuation of application No. 13/202,072, filed on Aug. 17, 2011, now Pat. No. 8,709,135.

(51) Int. Cl.
*B01D 5/00* (2006.01)
*B01D 53/04* (2006.01)
(Continued)

(52) U.S. Cl.
CPC .............. *B01D 53/72* (2013.01); *B01D 5/0039* (2013.01); *B01D 5/0054* (2013.01); *B01D 5/0069* (2013.01); *B01D 53/002* (2013.01); *B09C 1/005* (2013.01); *B01D 53/265* (2013.01); *B01D 2251/306* (2013.01); *B01D 2253/102* (2013.01); *B01D 2253/104* (2013.01); *B01D 2253/108* (2013.01); *B01D 2256/10* (2013.01); *B01D 2257/104* (2013.01); *B01D 2257/504* (2013.01); *B01D 2257/708* (2013.01);
(Continued)

(58) Field of Classification Search
CPC .. B01D 53/002; B01D 53/265; B01D 5/0039; B01D 5/0054; B01D 5/0069; B01D 2257/708; B01D 2258/06; Y02C 20/20
USPC .................. 95/39, 41, 43, 90, 148; 405/128.1
See application file for complete search history.

(56) References Cited

U.S. PATENT DOCUMENTS

| 4,421,532 A | 12/1983 | Sacchetti et al. |
| 5,152,812 A | 10/1992 | Kovach |

(Continued)

*Primary Examiner* — Frank Lawrence
(74) *Attorney, Agent, or Firm* — Peter Jon Gluck;Patnstr, APC

(57) ABSTRACT

An off gas purification system provides superior results to other systems for removing volatile organic compounds from off gas, especially off gas from soil, groundwater, industrial processes, pipelines and storage tanks. Off gas is extracted, followed by compression and condensation. Compression and condensation produce an off gas that must be further treated to produce pollutant-free exhaust. A separation device cleans the influent gas/air by separating residual chemical vapor from the gas stream and returning that chemical vapor to the compression and condensation step. After removal of all detectable volatile organic compounds, the air stream may be further separated into segregated gases, and heated gas is used to thermally enhance the desorption or degradation of volatile organic compounds from the off gas source or a separation device. Methods of accomplishing the same are similarly provided, including unique business methods for conforming extraction and processing plans with current environmental regulations and compliance impact generation based on an evolved knowledge base.

9 Claims, 6 Drawing Sheets

(51) Int. Cl.
  *B01D 53/72* (2006.01)
  *B01D 53/00* (2006.01)
  *B09C 1/00* (2006.01)
  *B01D 53/26* (2006.01)

(52) U.S. Cl.
  CPC ............ *B01D 2258/06* (2013.01); *Y02C 20/20* (2013.01); *Y02P 70/34* (2015.11)

(56) References Cited

U.S. PATENT DOCUMENTS

| | | | |
|---|---|---|---|
| 5,740,682 | A | 4/1998 | Lavie |
| 7,658,789 | B1 | 2/2010 | Krumbholz |
| 8,986,429 | B2 * | 3/2015 | Krumbholz et al. ............ 95/90 |
| 2010/0292524 | A1 | 11/2010 | Turner et al. |

* cited by examiner

VOC SOURCE REMOVAL AND OFF GAS PURIFICATION SYSTEM

CROSS-REFERENCE TO RELATED APPLICATIONS

The instant filing claims full Paris Convention Priority from U.S. patent application Ser. No. 13/202,072, expressly incorporated herein by reference, as if fully set forth herein.

BACKGROUND

An off gas purification system provides superior results to other systems for the recovery of volatile organic compounds and the cleansing of output air that is free of detectable volatile organic compounds. Off gas is extracted from a source of off gas, followed by steps of compression and condensation. Compression and condensation produce liquid condensates and an off gas that must be further treated to produce pollutant-free exhaust. A separation device removes VOCs from the compressed air stream and returns those VOCs to the front of the system. The system emits discharge air that is free of any and all detectable volatile organic compounds per EPA's TO-15 method of sampling and analysis. Discharge air may be routed through conventional scrubbers or filters as a fail-safe in case of system failure, as prescribed by environmental regulation. Prior to discharge, cleansed air may be heated and returned to the source of the off gas to thermally enhance desorption of remaining volatile organic compounds, wherein the vacuum pulsation of the off gas purification system creates differential pressure gradients in the source of the off gas which further improves VOC desorption and removal. Cleansed heated air may be concurrently returned to the separation device to thermally enhance desorption of volatile organic compounds. Cleansed air may be concentrated into one or several gas varieties prior to heating and routing.

SUMMARY

Methods of accomplishing the same are similarly provided, for efficiently remediating polluted media by optimizing target off gas extraction and processing of the same to achieve compliance with changing environmental regulations. According to a feature of the present disclosure, a system for extracting pollutants from off gas is disclosed comprising, in combination: at least one off gas extraction source, a vacuum and compression source, a heat exchanger to condense fluid from off gas, and a separation device having at least one separator.

According to another feature, a separation module is disclosed comprising, in combination: at least one chamber containing an adsorbent, where each chamber has at least one inlet and at least one outlet. The adsorbent is charged with a pollutant at a starting pressure and the pollutant is unloaded from the adsorbent at lower pressure.

According to another feature, a separation module is disclosed comprising, in combination: a membrane separation device operating under pressure and having at least one inlet and at least two outlets. The membrane has a selective acceptance for VOCs, which are exhausted through a first outlet for further treatment. The membrane has a selective rejection for oxygen, nitrogen and carbon dioxide, which are exhausted through a second outlet.

Moreover, further features of the present disclosure are disclosed including a method of extracting pollutant from soil comprising in combination: extracting an off gas, compressing the off gas, condensing the off gas to form at least one liquefied contaminant, adsorbing any residual pollutants from the compressed condensed off gas with at least one separation module to produce an air discharge that is free of volatile organic compounds, utilizing a portion of the and discharged air to thermally enhance desorption of volatile organic compounds, separating recovered condensates into at least one subset of condensate, recycling one or several of the recovered condensates, and determining compliance with applicable regulatory requirements.

Further features of the present disclosure include: (1) separating the pollutant free air into nitrogen, carbon dioxide, and oxygen gasses; (2) generating ozone gas from oxygen gas; (3) heating the discharge air, or one or several separated gases of the discharge air, or other media, to thermally enhance the extraction of volatile organic compounds from the off gas source or a separation module; (4) periodically varying the flow and vacuum of off gas extraction from the off gas source to prevent the formation of preferential pathways, thereby more evenly removing VOCs from the off gas source; and (5) periodically varying the flow and pressure of the discharge air, or one or several separated gases of the discharge air, injected into the off gas source to prevent the formation of preferential pathways, thereby more evenly removing VOCs from the off gas source.

DETAILED DESCRIPTION

Figure 1:
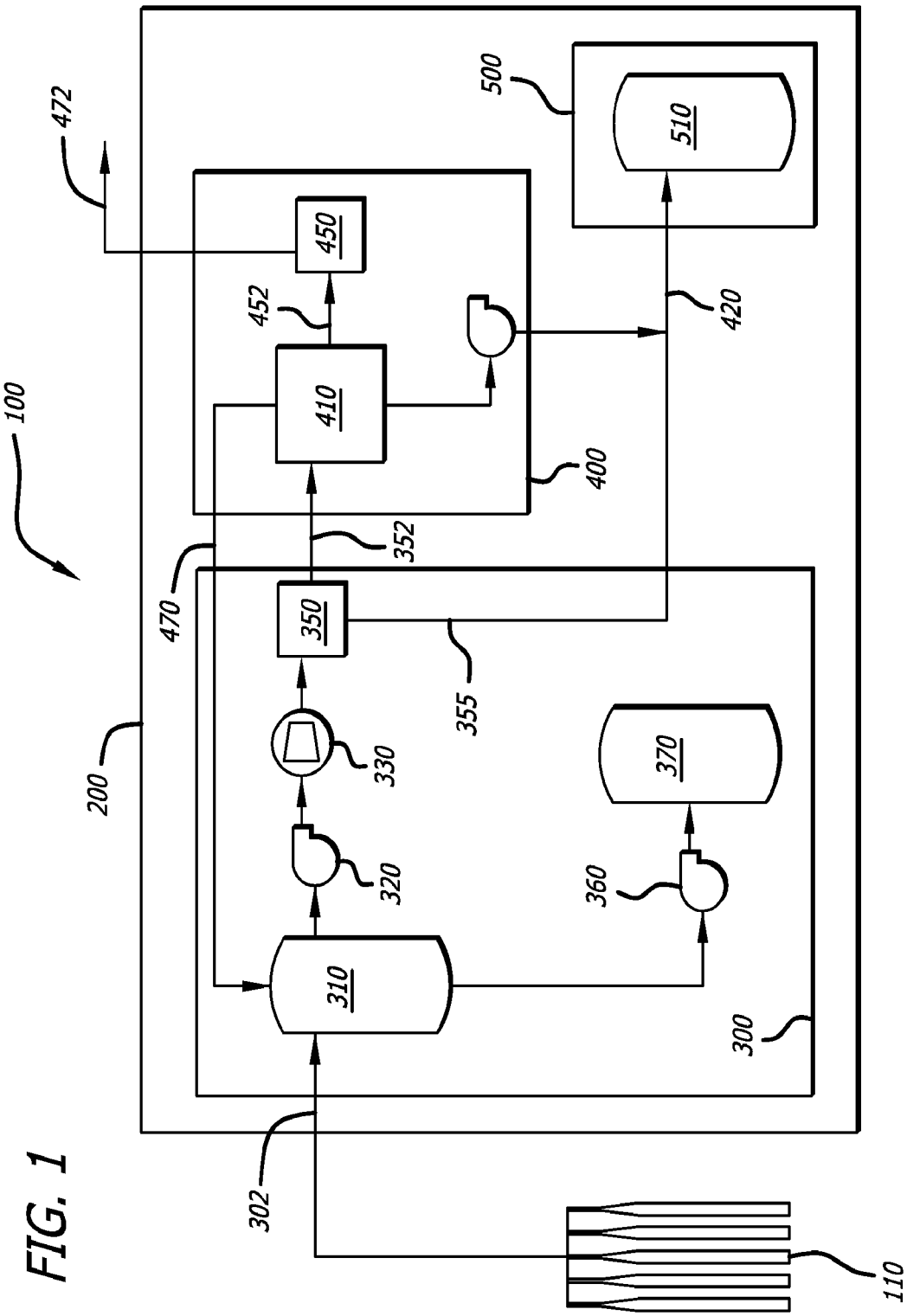
FIG. 1 shows an embodiment of a VOC removal system.

As used in the present disclosure, the term "off gas" shall be defined as gasses extracted from at least one source of off gas, including but not limited to vapors to-be-removed during the course of soil or groundwater remediation activities. As used in the present disclosure, the term "pollutant free" shall be defined as having VOC content less than 100 parts per billion by volume (ppbv) as measured per the standards of EPA's Total Organics 15 (TO-15) method.

Soil vapor extraction (SVE), also known as "soil venting" or "vacuum extraction", is an in situ remedial technology that reduces concentrations of volatile pollutants. In this technology, a vacuum is applied to wells near the source of contamination in the soil. Volatile constituents of the contaminant mass "evaporate" and the vapors are drawn toward and extracted through the extraction points. Extracted vapor is then cleansed. The increased airflow through the subsurface can also stimulate biodegradation of some contaminants, especially those that are less volatile. Wells may be either vertical or horizontal. SVE has been successfully applied to many petroleum derived volatile organic compounds (VOCs) as well as semi-volatile organic compounds (SVOCs). However, other chemicals present in the soil have been difficult, if not impossible, to remove using technologies prior to the present disclosure. Indeed, prior technologies are unsuited for remediation of halogenated chemicals, chloromethane, and many other volatile chemicals.

Prior technologies often rely on the manipulation of pressure, temperature, or both pressure and temperature in order to condense a portion of VOCs from the off gas stream. For example, utilization of direct liquid nitrogen cooling to achieve an off gas temperature of below −90° C. (at sea level pressure of 14.7 psi) to treat a stream of Tetrachloroethylene will emit an output gas still containing above about approximately 55 parts per million volume (ppmv) Tetrachloroethylene, an emissions discharge that must be further reduced to meet state and federal air emissions regulations. Other technologies will compress the off gas in order to increase VOC removal efficiency at a given heat exchange temperature, yet this method will not produce an effluent stream substantially free of VOC content. As such, these systems are generally coupled with scrubbing units for residual removals of contaminated vapor prior to release to the atmosphere. Usually, scrubbing units comprise granular activated carbon (GAC) traps. Once each GAC trap becomes saturated with residual contaminant, they must be replaced and new activated carbon used. Certain regenerative systems treat GAC with steam, which removes contaminants from the carbon, said contaminants, water and steam still requiring treatment. For certain chemicals, such as halogenated compounds, the heat and water from steam results in strong hydrophilic acids. These acids are difficult to handle, involve health and safety risks, cause corrosion, and consequently carry with them increased costs of remediation. Moreover, remediation sites may often contain these types of chemicals in combination with other VOCs.

When contaminated vapors are not removed in the compression/condensation step, the scrubbing units become the primary component for removing these types of VOCs. The result is more frequent replacement or regeneration of the scrubbing reagents, as well as undesirable side effects previously discussed and many others. For example, placing a regenerating media VOC capture device in front of a VOC condensing device is well known in the art. In this instance, the regenerating media VOC capture device works as a vapor concentrator, adsorbing water and VOCs during a loading cycle, and desorbing said water and VOCs during a regeneration cycle wherein the desorbed water and VOCs are directed to a VOC condensing device. It is also common practice to route the residual VOCs from the VOC condensing device back to the regenerating media VOC capture device for additional treatment. The problem with this process arrangement and design is at least fourfold. First, the selected adsorption for VOCs of the capture device's absorbent is significantly reduced by the concurrent adsorption of water vapor and VOCs, thus requiring more frequent adsorbent regenerations or additional adsorbent volume. Secondly, the efficiency of the capture device is negatively impacted by an increased workload from the VOC concentration fluctuations when residual VOCs are redirected to it from the VOC condensing device. Thirdly, the efficiency of the capture device is negatively impacted by volume fluctuations when residual VOCs are redirected to it from the VOC condensing device. Fourthly, the efficiency of the capture device is negatively impacted by the cold temperature gas stream redirected to it from the VOC condensing device, which inhibits the adsorption capacity of adsorbents.

Similar regenerative processes that require heat are potentially dangerous with VOCs that have high vapor pressures. Introducing heat in the presence of oxygen in these situations may lead to fires and explosions. In addition to potential destruction of hardware that may occur due to fires and explosions, the VOCs or dangerous byproducts may also be released generally into the atmosphere. Thus, a system is needed to allow SVE remediation for VOCs that are not suited to traditional VOC methods and systems.

Current in situ treatment technologies, including soil vapor extraction, dual phase extraction, air sparging, soil venting and closed loop or semi-closed loop soil aeration systems are inefficient at removing VOCs with low vapor pressure, such as methylene chloride. In situ injection of steam, warmed water or warmed air is known to increase the vapor pressure of certain VOCs and SVOCs, thus aiding the desorption and vapor extraction of those compounds. However, such processes require substantial energy that must be created for the specific purpose of heating the media to be injected in situ. Such treatment technologies are also limited by constant vacuum and flow through extraction points, and the constant pressure and flow through injection wells, both methods contributing to the development of preferential or selective pathways, whereby airflow through soil and groundwater is not uniformly distributed.

The separation of air into various gas varieties, such as oxygen, nitrogen, carbon dioxide or combinations therein, is a well-known process. However, if any residual water or VOC content exists in the feedstock air, such VOCs will be transferred to the several gas varieties to-be-separated. Many VOCs are soluble in water, so any water vapor content will necessarily contain a partial VOC content. This is problematic because state and regulatory agencies may not allow the in situ injection of air or gases containing detectable levels of VOCs or other contaminants. Indeed, the reintroduction of contaminants into the soil or groundwater inhibits the continuing VOC removal efforts of those media. Also, the presence of residual water or VOC content reduces the efficiency of separation devices utilizing membrane separation technologies. To properly separate VOCs from air, or individual gases from air, membrane separation technologies require dry air. The presence of water vapor in the air may reduce the removal efficiency of the membrane device and clog the membrane, necessitating costly repairs or replacements.

The present disclosure addresses this need by providing a novel enhanced VOC removal system and methods capable of enhancing VOC desorption and removal. Turning now to FIG. 1, there is shown an embodiment of a VOC removal system 100. VOC removal system 100 generally comprises a plurality of extraction points 110 and VOC processing system 200. VOC processing system 200 comprises a number of subsystems, according to embodiments, including vacuum and compression module 300, vapor elimination module 400, and contaminant recovery module 500. Vacuum and compression module 300 removes off gas from extraction points 110, removes liquid constituents recovered in the off gas removal process, and compresses the off gas to a predetermined pressure. Vapor elimination module 400 removes contaminated vapor from the gas, producing a dry gas as an intermediate result.

Figure 2:
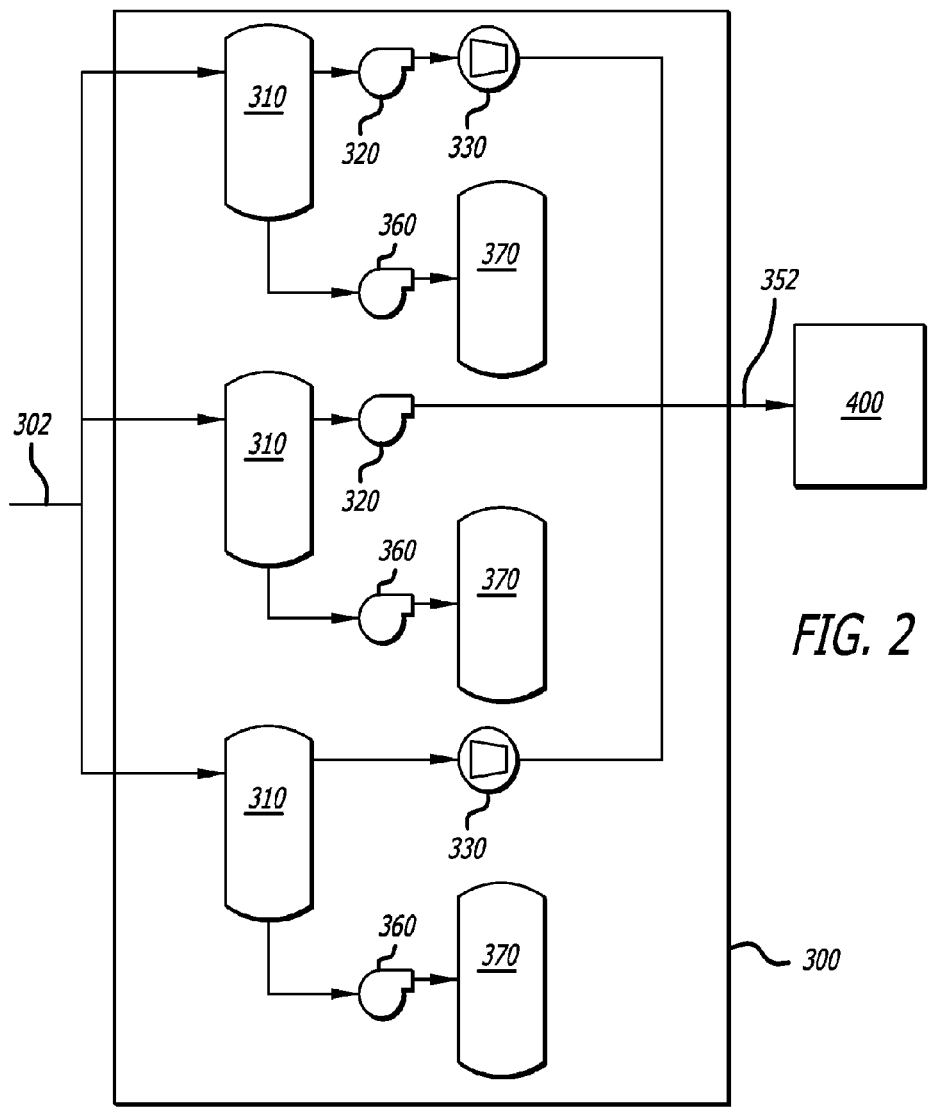
FIG. 2 shows an embodiment of a vacuum and compression module.
Figure 2A:
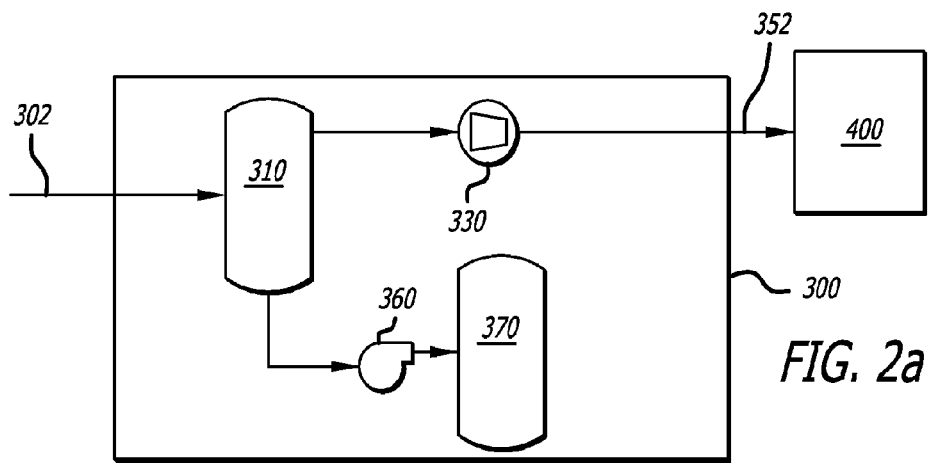
FIG. 2a shows another embodiment of a vacuum and compression module.
Figure 2B:
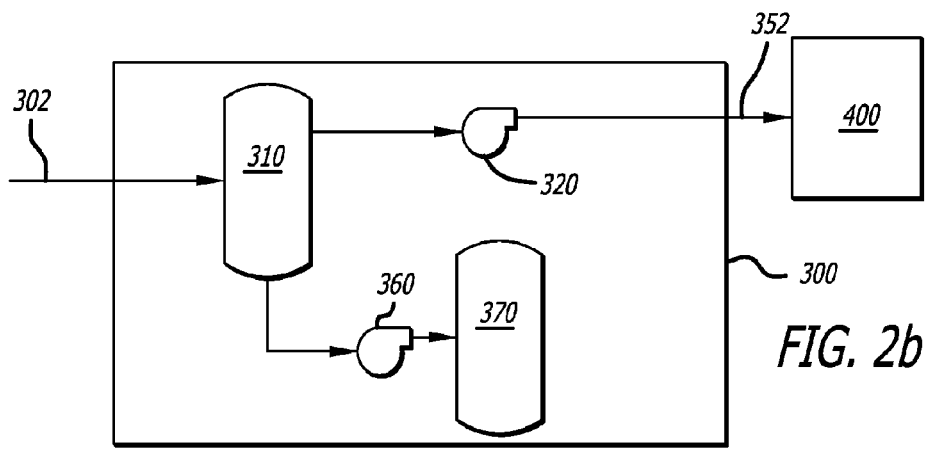
FIG. 2b shows another embodiment of a vacuum and compression module.

According to an embodiment of vacuum and compression module 300 in FIG. 2, contaminated vapor is removed from extraction points 110 and transferred via inlet conduit 302 into vacuum and compression module 300. According to embodiments, water and gas are separated using gas/water separator 310 to prevent liquid from entering compressor 330. According to embodiments, gas/water separator 310 may be, for example, a stainless steel vertical tank Gas/water separator 310 comprises an inlet connected to inlet conduit 302, a gas outlet, and a liquid outlet. The gas outlet is connected to inlet blower, for example a rotary claw type blower. Blower 320 is used to create a vacuum that pulls vapor from extraction points 110. Other similar devices may be used depending on the desired gas flow rate, etc. as known and understood by a person of ordinary skill in the art. Turning to FIG. 2a, when predetermined conditions dictate low vacuum conditions from extraction points 110 or vapor treatment in vapor elimination module 400 requires high compression rates, the preferred embodiment of vacuum and compression module 300 utilizes one or several compressors 330 without any blower 320. Any required vacuum and compression is created by one or several compressors 330.

As shown in FIG. 1, the liquid inlet connects to transfer pump 360, which pumps liquid from gas/water separator 310 into initial contaminant recovery tank 370. Generally, depending on the well configuration, little water will be extracted from extraction point 110. However, if the water table is high, slurping may occur necessitating gas/water separator 310 to separate the water from the gas. According to this configuration, holes are inserted into pipes at each extraction point site, some above that water table and some below. The vacuum pulls both vapor and water from the well, which 30 is then separated by gas/water separator 310. Transfer pump 360 removes liquid from gas/water separator 310. Transfer pump 360 may be, for example, a centrifugal, 120/230 volt, 2 horsepower motor pump capable of moving 50 gallons per minute, according to embodiments. Naturally, extraction points 110 that produce large volumes of water may need transfer pump 360 that is capable of pumping liquid at a more rapid rate. Similarly, extraction points 110 producing only nominal amounts of water may be fitted with transfer pump 360 that moves fewer gallons per minute. The exact choice of transfer pump 360 will be known and understood by artisans. Initial contaminant recovery tank 370 may be any tank suitable for the purpose of collecting contaminated liquids. As described below, a specific gravity separator may be disposed between transfer pump 360 and initial contaminant recovery tank 370 to separate each specific contaminant from the other contaminants, according to embodiments.

Compressor may be any number of conventional air compressor systems known to artisans, e.g., a Kobelco oil free rotary screw air compressor, 525 scfm at 160 psi, powered by a 125-horsepower TEFC 240/480 volt electric motor. A person of ordinary skill in the art will know and understand the applicable compressors to use based on the relevant parameters in the system. According to embodiments, air compressor 330 will be able to compress gas to at least 20 psi. Compressed gas containing contaminated vapor concentrates the contaminated vapor for later removal in vapor elimination module 400. After gas is compressed with gas compressor 330, exhaust from vacuum and compression module 300 is directed to vapor elimination module 400 via vapor elimination inlet conduit 352.

According to embodiments, vapor elimination module 400 comprises condensation module 410 and separation module 450. Vapor is initially directed to condensation module 410. In condensation module 410, a great majority of contaminated vapor is condensed and caused to be collected by primary contaminant recovery tank 510. In separation module 450, residual contaminated vapor is captured and routed to the front of VOC processing system 200 and rerouted into vacuum and compression module 300; clean air from separation module 450 is exhausted from the system via conduit 472, the clean air exhausted being free of detectable concentrations of VOCs.

Figure 3:
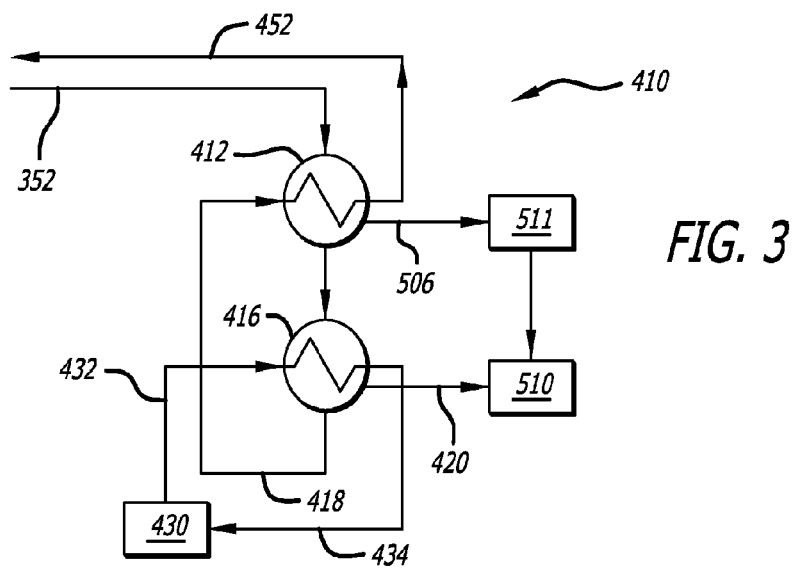
FIG. 3 shows an embodiment of a condensation module with a heat exchange system for reducing the temperature of the gas containing contaminated vapor.

According to an embodiment shown in FIG. 3, further differentiation of other systems is schematically illustrated, whereby, for example condensation module 410 comprises a heat exchange system for reducing the temperature of the gas containing contaminated vapor. This module responds to ongoing challenges others have had in dealing with certain volatiles which are not easily converted into the liquid phase. The process causes many chemicals to condense into a liquid, which is subsequently routed to contaminant recovery module 500. According to embodiments, condensation module 410 comprises a plurality of heat exchanging mechanisms 412, 416. Air/air heat exchanger 412 accomplishes initial cooling of compressed contaminated vapor. Importantly, air/air heat exchanger removes virtually all of the water and water vapor in the compressed gas.

After initial cooling has occurred, the compressed contaminated vapor is transferred to air/refrigerant heat exchanger 416 via warm vapor conduit 414. Further cooling of the compressed contaminated vapor occurs in air/refrigerant heat exchanger 416, causing condensation of the compressed contaminated vapor as the temperature of the gas containing the contaminated vapor drops below condensation point depending on the chemical being condensed. Air/refrigerant heat exchanger 416 may be comprised of either an indirect heat exchanger or a direct heat exchanger. Air/refrigerant heat exchanger 416 may be utilize either non-cryogenic refrigerants (i.e., R507, propane, ammonia) or cryogenic refrigerants (i.e., purified ammonia or liquid nitrogen). At this stage, the compressed vapor is free of water and water vapor and substantially devoid of VOCs, according to embodiments. Air/air heat exchanger 412 and air/refrigerant heat exchanger 416 work in tandem to heat and cool their respective input and output gasses. All or part of the cold output from air/refrigerant heat exchanger 416 is routed through air/air heat exchanger 412 via cold vapor conduit 418. The regulation of flow of the cold output from air/refrigerant heat exchanger 416 is routed through air/air heat exchanger 412 via cold vapor conduit 418 is controlled by valve 419. Warm gas incoming to air/air heat exchanger 412 from vacuum and extraction module 300 via vapor elimination inlet conduit 352 is therefore cooled by the cold gas routed into air/air heat exchanger 412 and the cold gas in cold vapor conduit 418 is likewise warmed by warm gas incoming from vacuum and extraction module 300 via vapor elimination inlet conduit 352. According to embodiments, air/air heat exchanger 412 and air/refrigerant heat exchanger 416 may be disposed in condensation module 410 in pairs. In this embodiment, the pairs of heat exchangers 412, 416 work in cycles. During the cooling phase in air/refrigerant heat exchanger 416, condensate of the compressed contaminated vapors forms. Condensate will continue to form as long as refrigerant remains in air/refrigerant heat exchanger 416. To remove the condensate, the air/refrigerant heat exchanger 416 must undergo a thawing cycle to liquefy the condensate and remove it, which requires the refrigerant to be removed. Thus, by using pairs, first air/refrigerant heat exchanger 416 cools while the second air/refrigerant heat exchanger 416 thaws. Once thawing is complete, the respective functions are reversed and the first air/refrigerant heat exchanger 416 thaws while the second air/refrigerant heat exchanger 416 cools. Thawed liquefied contaminant is removed from heat exchangers 412, 416 as would be known to artisans. The heat exchange process described herein is accomplished, according to embodiments, in cycles to optimize heat exchange and prevents air/refrigerant heat exchanger 416 from freezing up.

According to embodiments, refrigerant and warm gas to be cooled by refrigerant are input at the same location and experiences parallel flow rather than cross flow, as known in the art. Embodiments employing parallel flow are more rapidly cooled, allowing for shorter cycle times and improving the overall efficiency of the system. According to embodiments, cross flow configurations and parallel flow configurations may be chosen on a case by case basis as would be known to a person of ordinary skill in the art. Air/refrigerant heat exchanger 416 exchanges heat as would be known to a person of ordinary skill in the art. That is, the refrigerant provides the cooling for the gas. The final temperature range of the gas depends on the coolant used, airflow, and other factors.

According to embodiments, if a majority of contaminant condenses in air/air heat exchanger 412, then gas flow may be increased or cycle time may be decreased as a matter of efficiency, or air flow from conduit 418 may be partially or entirely diverted around air/air heat exchanger 412 via valve 419. Similarly, where contaminated vapor fails to condense at an efficient rate, gas flow may be decreased or cycle time may be increased to expose gas to refrigerant for a longer period, or air flow from conduit 418 may be increased through air/air heat exchanger 412 via valve 419.

According to other embodiments where heat exchange occurs in cycles and gas flow rate through all heat exchangers remains constant, the duration the gas is exposed to the heat exchangers is varied. Thus, if air/air heat exchanger 412 inefficiently condenses vapor, the duration in the air/refrigerant heat exchanger 416 may be increased in each cycle. Thus, variations in the optimization of gas temperatures may likewise be effected.

According to other embodiments where additional temperature control is required, the gas flow rate through air/air heat exchanger 412 from conduit 418 is varied via valve 419. As the gas flow rate through air/air heat exchanger 412 from conduit 418 is decreased, the temperature of the air/air heat exchanger 412 will increase. Alternatively, as the gas flow rate through air/air heat exchanger 412 from conduit 418 is increased, the temperature of the air/air heat exchanger 412 will decrease.

According to embodiments, these temperature control techniques regulate temperature of the compressed contaminated gas to deliver it to air/refrigerant heat exchanger 416 within an optimal temperature range for low temperature condensation and heat exchanger cycling. Compressed contaminated gas that is too cold will not effectively warm cold exhaust from air/refrigerant heat exchanger 416 and compressed contaminated gas that is too warm will be inefficiently cooled in air/refrigerant heat exchanger 416, requiring cycle times to be increased to remove a substantial portion of contaminated vapors. Thus, tuning air/air heat exchanger 412 to provide an optimal compressed contaminated gas temperature prior to delivery to air/refrigerant heat exchanger 416 increases efficiency of the system and serves as an optimization step. For example, condensed vapor enters air/air heat exchanger 412 from conduit 352 at approximately 70° F. pressure dew point and leaves air/air heat exchanger 412 from conduit 452 at approximately 33° F. pressure dew point. In another configuration, condensed vapor enters air/air heat exchanger 412 from conduit 352 at approximately 33° F. pressure dew point and leaves air/air heat exchanger 412 from conduit 452 at approximately −20° F. pressure dew point.

As previously described, an initial condensate will be formed as the gas is cooled in air/air heat exchanger 412. The condensate is transferred to a segregated contaminant recovery tank 511 via conduit 506 or, according to embodiments, via conduit 506 to primary contaminant recovery tank 510. The gas cooled in air/air heat exchanger 412 then transfers to air/refrigerant heat exchanger 416 for further cooling to between approximately (−30)° F. and (−321)° F. due to the heat exchange between gas and refrigerant, as known to artisans.

As depicted in FIG. 3, refrigeration unit 430 provides refrigerant via refrigerant inlet conduit 432 to air/refrigerant heat exchanger 416 for cooling of the cold gas. To prevent freezing up problems, gas/gas heat exchanger 412 may be cycled with gas/refrigerant heat exchanger 416, as would be known to artisans. Thus, prior to freezing up, warmer gas from gas/gas heat exchanger 412 is used to warm the cold gas in gas/refrigerant heat exchanger 416. After cooling, the refrigerant returns to refrigeration unit 430 via refrigerant outlet conduit 434, according to embodiments. At this point in the process, all water vapor has been removed from the gas, but chemical vapors may remain due to varying dew points and vapor pressures. According to an embodiment, the final temperature of the cold gas depends on the length of time the gas is cooled and the refrigerant. In air/refrigerant heat exchanger 416 final condensation occurs and the condensate is collected before, during and after thawing and transferred to contaminant recovery module 500 via contaminant recovery module conduit 420. The dry cold gas is then transferred to air/air heat exchanger to cool incoming warm gas from vacuum and compression module 300 and warm the cold gas.

According to embodiments, gas warmed by air/air heat exchanger 412 and leaving via conduit 452 is then touted to separation module 450 to remove residual chemical vapors via separator inlet conduit 452. According to embodiments, multiple condensation modules 410 may be used in parallel or in series to improve efficiency of the condensation process. A person of ordinary skill in the art will understand that each off gas source may require optimization dependent on the particular contaminants extracted, their relative abundance, their vapor pressures, their dew points, and their specific heat of phase conversion. However, the prior art systems have been unable to be industrially effective for condensation of more challenging contaminants.

The present invention's optimizing differentiates it from extant systems, with condensation modules 410 used in parallel to provide for greater gas flow through the system. Conversely, condensation modules 410 may be used in series to expose contaminated vapor to subsequent condensation steps in an attempt to remove greater percentages of total contaminants during the condensation step, according embodiments. After the condensation step, residual contaminated vapor typically remains in the gas due to incomplete condensation or chemicals that are not cooled enough or for long enough for condensation to occur.

Artisans will appreciate that the placement of the separation module 450 after the condensation module 410 is optimal because water vapor has been removed from the gas stream exiting condensation module 410. Moreover, condensation module 410 acts as a VOC control device, providing a constant and predictable concentration of residual VOCs to be removed by separation module 450.

Figure 4:
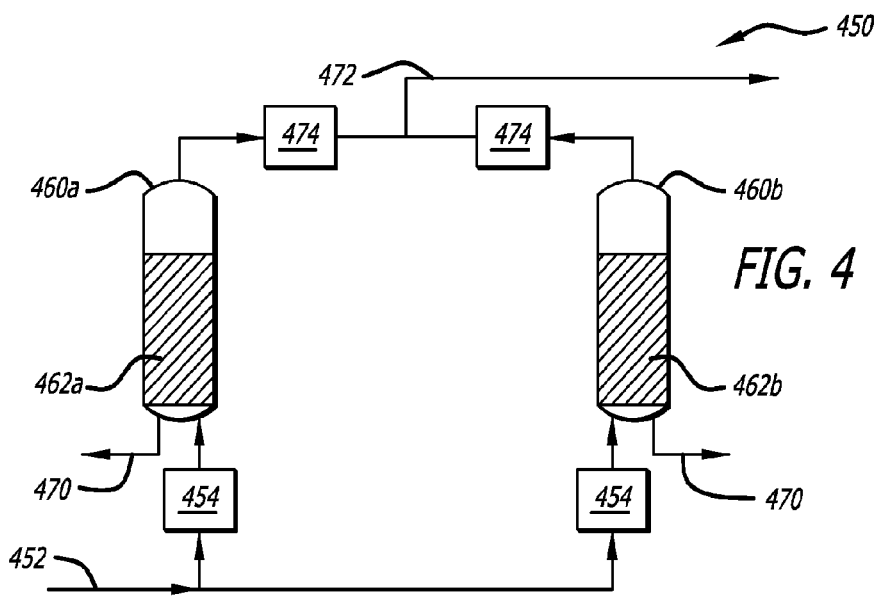
FIG. 4 shows another embodiment of a separation module having two adsorption chambers.

According to an embodiment in FIG. 4, pressurized gas containing residual contaminated vapor is routed to separation module 450 via separator inlet conduit 452. As shown, two adsorption chambers 460a, 460b work in tandem to adsorb residual contaminated vapor. During operation, one adsorption chamber 460a, 460b adsorbs residual contaminated vapor while the other adsorption chamber 460b, 460a deadsorbs contaminated vapor. The process of desorption regenerates adsorption material 462a, 462b for readsorption of contaminated vapor. According to an embodiment, an adsorption material 462a, 462b is activated alumina. According different embodiments, adsorption material 462a, 462b is granular activated carbon, pelletized activated carbon, KMNO4 impregnated material, permanganate, zeolites, and combinations thereof. A person of ordinary skill in the art will readily know and appreciate that other, similar materials and combinations of materials may be used in adsorption module depending on the nature of the off gas source, the chemicals involved and their concentrations, and goals of each VOC removal project.

Adsorption by adsorption materials, such as activated alumina, carbon, zeolites or resins, occurs at high pressure; desorption occurs at low pressure. Other similar materials and materials specifically suited to adsorption of specific chemicals, as well as their combinations, are expressly contemplated as would be known to a person of ordinary skill in the art. Contaminated vapor is introduced to separation module 450 via separator inlet conduit 452.

Disposed between regenerative adsorber inlet conduit and each adsorption chamber 460a, 460b are inlet valves 454. Inlet valve 454 control which adsorption chamber 460a, 460b is adsorbing residual contaminated vapor and adsorption chamber 460a, 460b desorbing contaminated vapor. During the adsorption process, inlet valve 454 is in an open position allowing gas containing residual contaminated vapor to enter adsorption chamber 460a, 460b and contact adsorption material 462a, 462b. During the desorption process, inlet valve 454 is in a closed position to prevent gas from entering adsorption chamber 460a, 460b.

During the adsorption process, gas containing residual contaminated vapor is forced through adsorption material 462a, 462b in adsorption chamber 460a, 460b. Adsorption material 462a, 462b removes vapor from the gas, including contaminated vapor. As vapor is removed from the gas, adsorption material 462a, 462b charges with contaminated vapor. Gas leaving adsorption chamber 460a, 460b is therefore pollutant free. Artisans will recognize that one of flow rate of the gas containing contaminated vapor or cycle time will vary from remediation site to remediation site. Depending on the types of chemicals being removed, the concentration of the contaminants, the relative amount of contaminated vapor removed in previous steps, for example compression/condensation, and the efficiency of adsorption material 462a, 462b in removing particular vapors from the gas, the parameters within which the system runs will differ. To that end, a person of ordinary skill in the art will know and understand that flow rate or cycle time, adsorption material 462a, 462b, surface area of adsorption material 462a, 462b, and other similar variables known to artisans will be evaluated and optimized on a per site basis. In some cases, multiple regenerative adsorption modules 450 will be used in so series to accomplish a desired reduction in contaminated vapor passing through vapor elimination module 400. According to an embodiment where adsorption material 462a, 462b is activated alumina or other materials, adsorption of vapor in gas occurs at high pressure. For example and according to an embodiment, gas entering condensation module 410 is at approximately 150 PSI (referring back to FIG. 1) having been compressed prior to entering condensation module 410. After leaving condensation module 410 and entering separation module 450, gas pressure is still at approximately between 120 to 150 PSI.

Referring again to FIG. 4, once gas has been exposed to and caused adsorption material 462a, 462b to be charged with contaminated vapor, the exhaust is substantially clean. It escapes through clean exhaust conduit 472. Disposed on clean exhaust conduit 472 are clean exhaust valves 474, according to the exemplary embodiment. Generally, at least one clean exhaust valve 474 is disposed along clean exhaust conduit 472 per adsorption chamber 460a, 460b, although multiple clean exhaust valves 474 are contemplated as would be known to artisans. Clean exhaust conduit 472 releases substantially clean gas into the ambient air or routes the substantially clean gas to scrubbers 530, according to embodiments. A back pressure regulator may be disposed prior along clean exhaust conduit 472 to maintain a baseline of pressure in VOC removal system 100.

According to embodiments, clean exhaust valves 474 shunts a portion of substantially clean gas for the purpose of desorption. When clean exhaust valve 474 is "closed," it allows a small flow of clean exhaust gas to flow to charged adsorption chamber 460a, 460b and through charged adsorption material 462a, 462b. This low pressure flow causes adsorption material 462a, 462b to release the contaminated vapors collected in the charging step. These vapors exit through exhaust conduit 470 as inlet valve 454 is closed for charged adsorption chamber 460a, 460b as the desorption step occurs. To that end, clean exhaust valves 474 are configured to shunt a portion of the substantially clean gas into adsorption chamber 460a, 460b that is desorbing contaminated vapor.

Because desorption occurs at lower pressure, a small percentage of the total clean exhaust gas is diverted as a low pressure gas to desorbing adsorption chamber 460a, 460b, while the remaining substantially clean gas continues through clean exhaust conduit 472. The process of shunting a small percentage of substantially clean gas may be accomplished by partially opening clean exhaust valve 474 or through the use of a multiple valve system, as would be known to artisans. For example, clean exhaust valve 474 may comprise one valve that allows low-pressure substantially clean gas to pass during adsorption chamber's 460a, 460b desorption cycle and a separate valve that may be fully opened to allow high-pressure substantially clean gas to escape during the adsorption cycle.

The implementation of such a system will be known and understood by a person of ordinary skill in the art. Consequently, as one adsorption chamber, e.g., 460a, of separation module 450 is being charged with contaminated vapors and exhausting pollutant free exhaust gas, adsorption chamber, 460b is being desorbed of contaminated vapors previously collected and contained in adsorption material 462b. Desorption occurs as a percentage of the substantially clean gas forming a low pressure flow is shunted into adsorption chamber 460b. After adsorption chamber 460a becomes fully charged or just before becoming fully charged, the system is reversed and adsorption chamber 460b is charged with contaminated vapors while adsorption chamber 460a is desorbed of the previously collected contaminated vapors. During the desorption cycle of adsorption chamber 460a, 460b, adsorption material 462a, 462b starts in a state wherein adsorption material 462a, 462b is fully charged with contaminated vapor. As low-pressure substantially clean air is shunted into adsorption chamber 460a, 460b, vapor contained in adsorption material 462a, 462b is released from adsorption material 462a, 462b into the low-pressure substantially clean gas. The resultant gas comprises concentrated contaminated vapor. The gas containing the concentrated contaminated vapor is then routed through exhaust conduit 470 to vacuum and compression module 300 for recompression and rerouting through compression/condensation. Multiple separation modules 450 may be placed in series or in parallel as a matter of efficiency to ensure adequate removal of particularly difficult contaminants, which may be necessary to achieve pollutant free exhaust. Moreover, efficiencies of the present system may provide for increased gas flow rates, and thus more rapid remediation of a polluted remediation site, due to increased efficiency of VOC removal system 100 over conventional vapor extraction and treatment methods.

Figure 5:
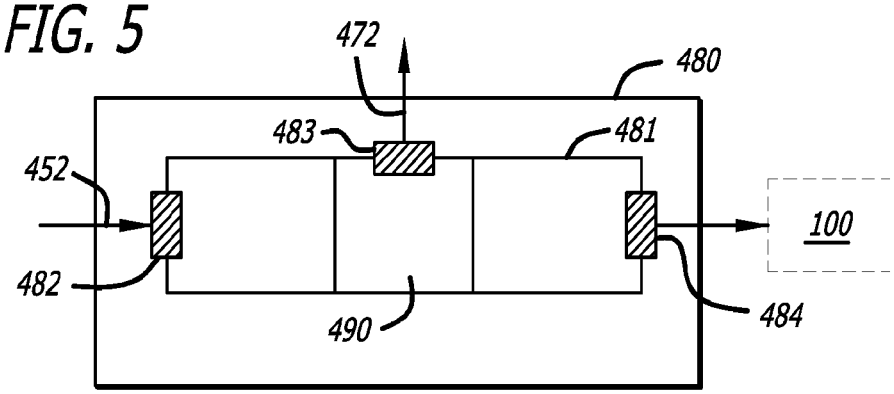
FIG. 5 shows an embodiment of a separation module having a membrane separator.

Turning to FIG. 5, an alternative preferred embodiment of separation module 450 is composed of a membrane separator 480 operating under a pressure of about approximately between 110 and 195 psig. Membrane separator 480 is composed of a membrane pressure housing 481, at least one membrane 490, at least one membrane housing inlet 482 and at least two membrane housing outlets 483 and 484. In this embodiment, membrane 490 is a semi-permeable type membrane that is permeable to VOC vapors but impermeable to nitrogen, oxygen and carbon dioxide. Compressed air exiting condensation module 410 via conduit 452 enters membrane separator 480 through membrane housing inlet 481 and is directed at membrane 490. VOC vapors are accepted through the membrane 490, wherein they pass through membrane 490 and exit the membrane pressure housing 481 through membrane housing outlet 483, thereby exiting membrane separator 480 and are routed to the vacuum and compression module 300 or condensation module 410 for reconcentration and processing. Nitrogen, oxygen and carbon dioxide, all being either pollutant free or substantially devoid of VOCs, are rejected by the membrane 490 and exit the membrane pressure housing 481 through membrane housing outlet 484.

In one embodiment, if further VOC removal of the gas exiting membrane housing outlet 483 is required, said gas may be directed to one or a plurality of separation modules 450, which may be placed in series or in parallel as a matter of efficiency to ensure adequate removal of particularly difficult contaminants, which may be necessary to achieve pollutant free exhaust. In this embodiment, the separation modules 450 in series or in parallel may be composed of one or several of the different separation modules 450 embodiments presently disclosed.

Figure 4A:
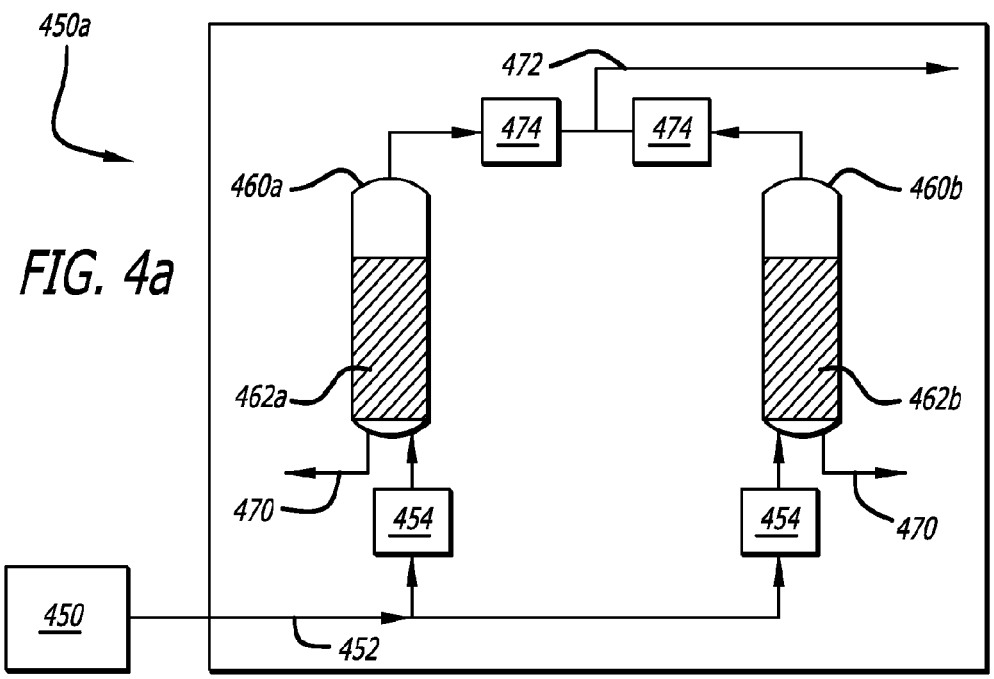
FIG. 4a shows another embodiment of a separation module having two adsorptior chambers.

Further separation of pollutant free air may be desired for purposes including: inerting, regenerating adsorbents, stimulating aerobic or anaerobic reactions, sparging into soil, sparging into water or on-site or industrial applications. In the embodiment of FIG. 4a, further separation of pollutant free air discharged from at least one separation module 450 is accomplished by processing said pollutant free air through at least one additional separation module 450, wherein that additional separation module 450a is configured for the sequestration of oxygen from the pollutant free air. According to an embodiment in FIG. 4, pressurized pollutant free air is routed to the present separation module 450 via separator inlet conduit 452. As shown, two adsorption chambers 460a, 460b work in tandem to adsorb nitrogen from the pollutant free air. During operation, one adsorption chamber 460a, 460b adsorbs nitrogen while the other adsorption chamber 460b, 460a deadsorbs nitrogen. Pressurized and pollutant free oxygen and other gas compounds, i.e., carbon dioxide, exit the present separation module 450 via separator outlet conduit 472. The process of desorption regenerates adsorption material 462a, 462b for readsorption of nitrogen.

According to an embodiment, an adsorption material 462a, 462b is zeolitic molecular sieve. According to different embodiments, adsorption material 462a, 462b is another commercially available nitrogen adsorbent, and combinations thereof. A person of ordinary skill in the art will readily know and appreciate that other, similar materials and combinations of materials may be used in adsorption module. Adsorption by adsorption materials, such as zeolitic molecular sieve, occurs at high pressure; desorption occurs at low pressure. Other similar materials and materials specifically suited to adsorption of nitrogen, as well as their combinations, are expressly contemplated as would be known to a person of ordinary skill in the art.

Figure 4B:
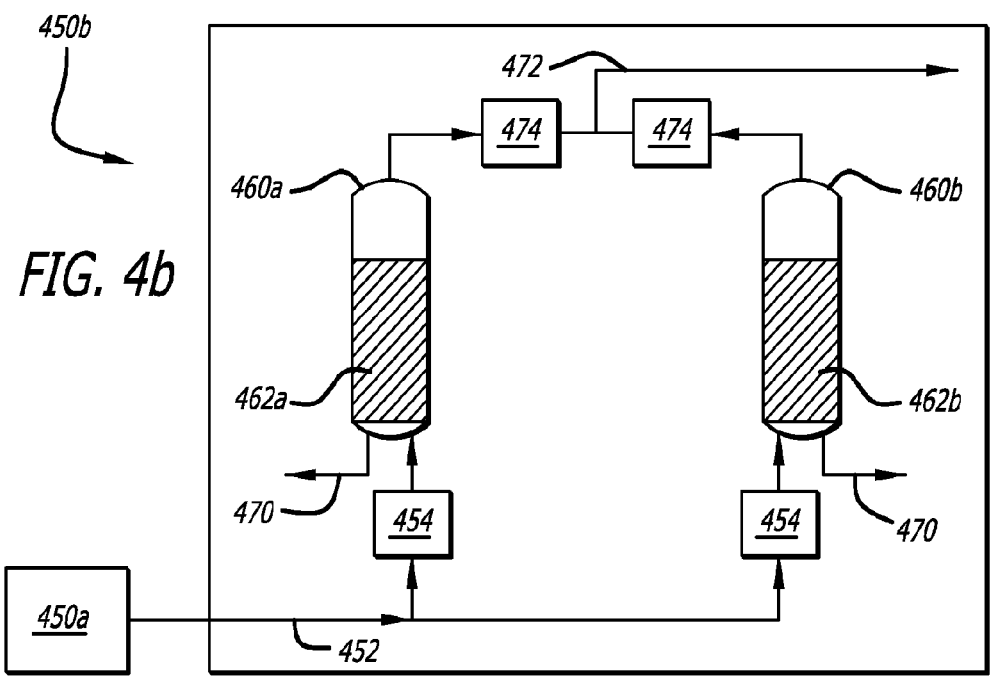
FIG. 4b shows an embodiment of a separation module having two adsorption chambers.

In the embodiment of FIG. 4b, further separation of pollutant free air discharged from at least one separation module 450 is accomplished by processing said pollutant free air through at least one additional separation module 450, wherein that additional separation module 450 is configured for the sequestration of nitrogen from the pollutant free air. According to an embodiment in FIG. 4b, pressurized pollutant free air is routed to the present separation module 450 via separator inlet conduit 452. As shown, two adsorption chambers 460a, 460b work in tandem to adsorb oxygen, carbon dioxide and other trace gases from the pollutant free air. During operation, one adsorption chamber 460a, 460b adsorbs oxygen, carbon dioxide and other trace gases while the other adsorption chamber 460b, 460a deadsorbs oxygen, carbon dioxide and other trace gases. Pressurized and pollutant free nitrogen exits the present separation module 450 via separator outlet conduit 472.

The process of desorption regenerates adsorption material 462a, 462b for readsorption of oxygen. According to an embodiment, an adsorption material 462a, 462b is carbon-based molecular sieve. According different embodiments, adsorption material 462a, 462b is another commercially available oxygen adsorbent, and combinations thereof. A person of ordinary skill in the art will readily know and appreciate that other, similar materials and combinations of materials may be used in adsorption module. Adsorption by adsorption materials, such as carbon-based molecular sieve, occurs at high pressure; desorption occurs at low pressure. Other similar materials and materials specifically suited to adsorption of nitrogen, as well as their combinations, are expressly contemplated as would be known to a person of ordinary skill in the art.

Additional separation modules 450, configured for the sequestration of nitrogen and/or oxygen from the pollutant free air, may be comprised of one or several membrane separators 480, wherein membrane 490 is semi-permeable and either rejects or accepts one of either oxygen or nitrogen.

Heating the some or the whole of pollutant free air or gas varieties from one or several separation modules 450 will be appreciated by artisans for its ability to further destroy any minute trace, residual contaminants which may still be present in the air stream to-be-heated. Moreover, when the pollutant free air or gas varieties from one or several separation modules 450 is entirely or partially directed to a VOC source, such as the affected soil, groundwater, or a separation module 450, artisans will appreciate the ability of heated pollutant free air or gas to accelerate the desorption of VOCs over unheated/less heated air or gas. Even more so, artisans will appreciate the transmission of heat between the heated pollutant free air or gas and the media of the VOC source, because said heat transmission accelerates and improves the VOC desorption throughout the entire VOC source, stimulating the uniform desorption of VOCs from traditionally problematic areas such as comparably less permeable soil zones and in situ areas that are comparably less influenced by vacuum extraction points.

Figure 6:
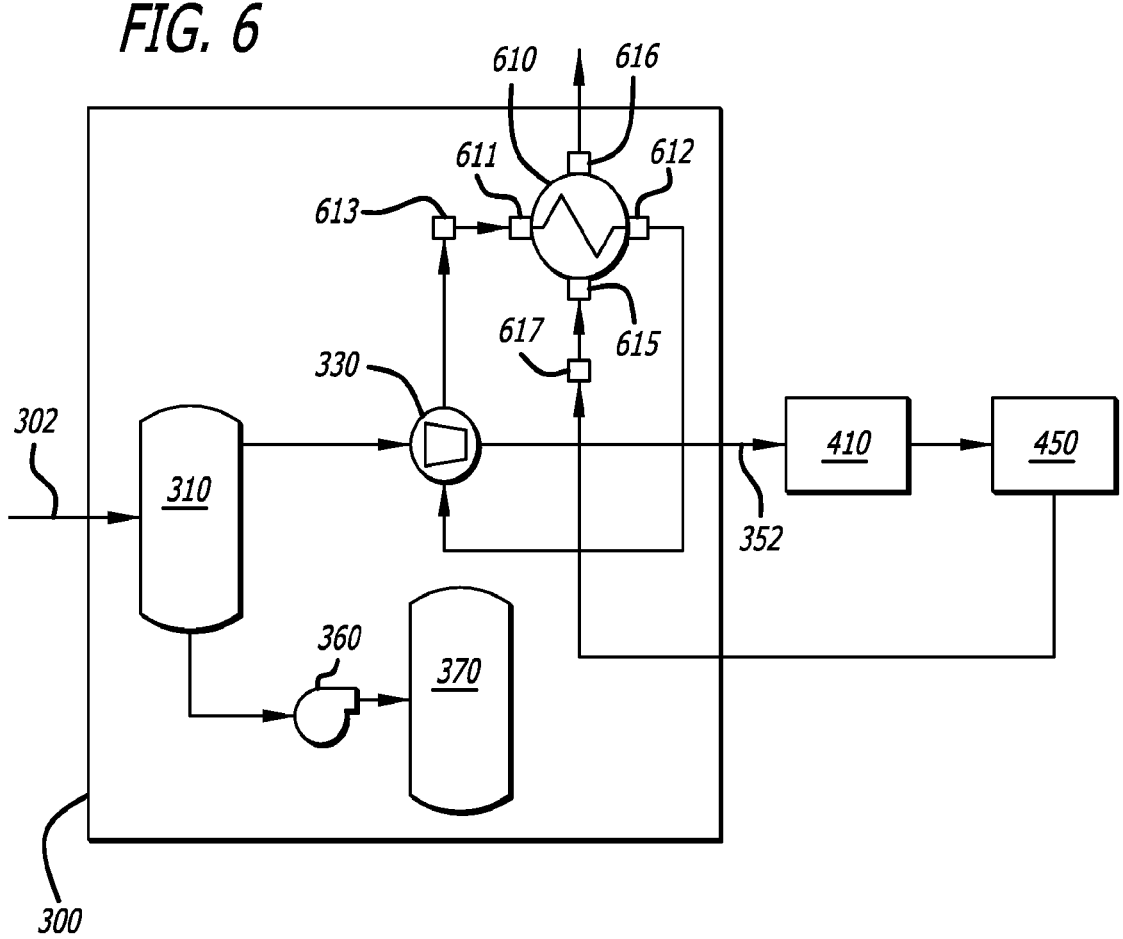
FIG. 6 shows an embodiment of a compressor system.
Figure 7:
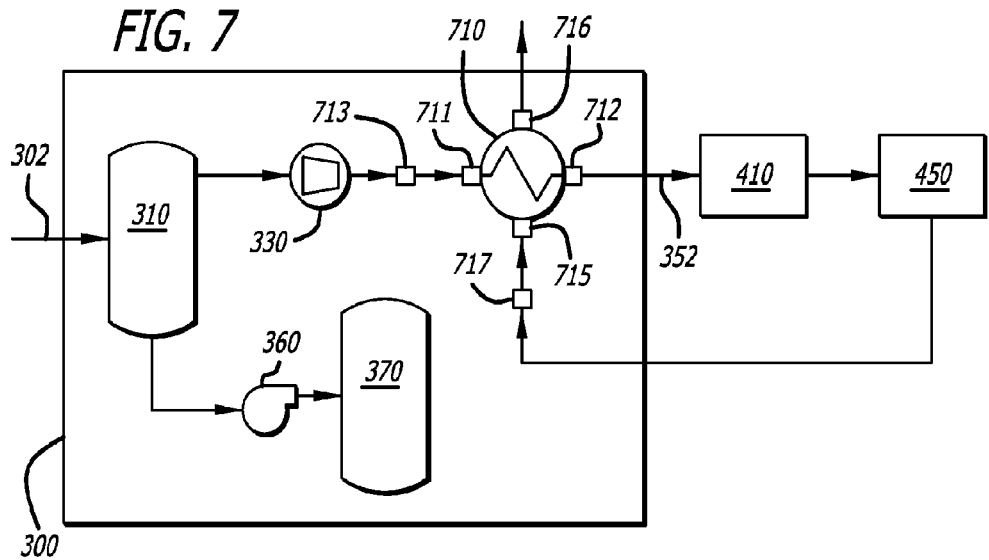
FIG. 7 shows another embodiment of a compressor system.
Figure 8:
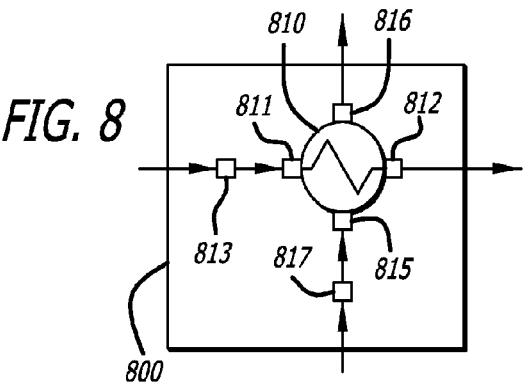
FIG. 8 shows an embodiment of a refrigerant compressor heat exchange module.

Traditionally, the heating of air or gas has consumed large quantities of specific and additional energy. This energy often in the form of electricity to power element heaters or combustible fuel to power furnace-type heaters. These traditional heating methods consume valuable resources at considerable monetary cost. Turning to FIGS. 6,7,8, artisans will appreciate three different embodiments which use byproduct/waste heat to heat air or gas without the need for specific or additional energy. FIG. 6 depicts a compressor 330, wherein the hot oil created by the compressor's operation enters oil/gas heat exchanger 610 through oil inlet 611 and exits through oil outlet 612. Concurrently, a flow of pollutant free gas enters oil/gas heat exchanger 610 through gas inlet 615 and exits through gas outlet 616. The flow of hot oil heats the cooler gas while the flow of cooler gas concurrently cools the hot oil. Cooled oil is returned to the compressor 330 while heated gas is further routed for its intended use. In one embodiment, the flow of oil heats the gas to approximately 170° F. while the flow of gas cools the oil to approximately 190° F. Oil valve 613 and gas valve 617 control the respective flows of oil and gas, enabling precise temperature control of both oil and gas exiting the oil/gas heat exchanger 610.

FIG. 7 depicts a compressor 330, wherein the hot gas exhausted by the compressor 330 enters gas/gas heat exchanger 710 through gas inlet 711 and exits through gas outlet 712. Concurrently, a flow of pollutant free gas enters gas/gas heat exchanger 710 through gas inlet 715 and exits through gas outlet 716. The flow of hot gas heats the cooler gas while the flow of cooler gas concurrently cools the hot gas. Cooled gas is delivered for its intended further use while heated gas is further routed for its intended use. In one embodiment, the flow of gas from compressor 330 heats the pollutant free gas to approximately 300° F. while the flow of gas cools the oil to approximately 310° F. Gas valve 713 and gas valve 717 control the respective flows of gas from compressor 330 and pollutant free gas, enabling precise temperature control of both gasses exiting the gas/gas heat exchanger 710.

FIG. 8 depicts a refrigerant compressor heat exchange module 800, wherein the hot refrigerant to-be-returned to the refrigerant compressor of condensation module 410 enters refrigerant/gas heat exchanger 810 through refrigerant inlet 811 and exits through refrigerant outlet 812. Concurrently, a flow of pollutant free gas enters refrigerant/gas heat exchanger 810 through gas inlet 815 and exits through gas outlet 816. The flow of hot refrigerant heats the cooler gas while the flow of cooler gas concurrently cools the hot refrigerant. Cooled refrigerant is returned to the refrigerant compressor for reuse while heated gas is further routed for its intended use. In one embodiment, the flow of refrigerant heats the pollutant free gas to approximately 150° F. while the flow of gas cools the oil to approximately 160° F. Refrigerant valve 813 and gas valve 817 control the respective flows of refrigerant and pollutant free gas, enabling precise temperature control of both refrigerant and pollutant free gas exiting the refrigerant/gas heat exchanger 810.

In another embodiment, the pollutant free air from at least one separation module 450 is substituted by atmospheric or ambient air that is heated in a heat exchanger of FIG. 6, 7 or 8. In yet another embodiment, the pollutant free air from at least one separation module 450 is substituted by at least one liquid that is heated or boiled in a heat exchanger of FIG. 6, 7 or 8.

Figure 9:
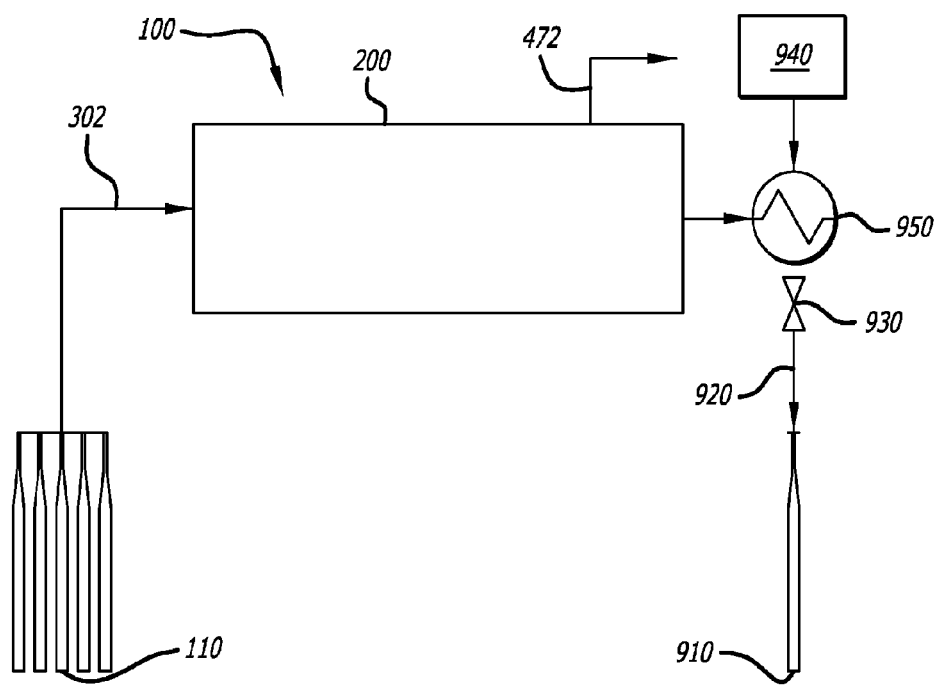
FIG. 9 shows an injection point, injection conduit, conduit controller and heat exchanger.

As previously mentioned, the injection of heated pollutant free air, gas, liquid or steam into a VOC source accelerates and improves the desorption of VOCs versus the injection of unheated/less heated air, gas, liquid or steam into the VOC source area. Moreover, the transmission of heat from the heated injection media to the VOC source is desirable because said heat transmission accelerates and improves the VOC desorption throughout the entire VOC source, stimulating the uniform desorption of VOCs from traditionally problematic areas such as comparably less permeable soil zones and in situ areas that are comparably less influenced by vacuum extraction points. FIG. 9 sets forth an injection point 910, injection conduit 920, conduit controller 930 and heat exchanger 950. In one embodiment, injection point 910 is a one inch diameter well having a screened area aperture, injection conduit 920 is an insulated pressure line, conduit controller 930 is an ASCO-type piston valve, and heat exchanger 950 is a heat exchanger or FIG. 6, 7, or 8. In this embodiment, repeating periodic counter-concurrent cycles of steam of water and pollutant free nitrogen are routed from water source 940 (this may be the water recovered from the condensation module 410 and heated in heat exchanger 950) and pollutant free nitrogen (from separator module 450 and heated in heat exchanger 950), respectively. Heat exchanger 950 has one hot gas side, through which hot gas from compressor 330 flows, and one injection media side, through which water, nitrogen or a combination there of flow. A flow of water from water source 940 is established through the media side of Heat exchanger 950. Heat exchanger 950 heats water from water source 940 to approximately 300° F., wherein water is boiled from liquid to gas steam. This steam is directed through injection conduit 920 and conduit controller 930, exiting injection point 910 into the VOC source soil, where said steam is still approximately 280° F. when it begins to transfer heat to soil.

At a predetermined interval, the flow of water through heat exchanger 950 is stopped, and replaced by a flow of nitrogen from separator module 450. Heat exchanger 950 heats pollutant free nitrogen to approximately 320° F. This heated nitrogen is directed through injection conduit 920 and conduit controller 930, exiting injection point 910 into the VOC source soil, where said nitrogen is still approximately 310° F. when it begins to transfer heat to soil. At a predetermined interval, the flow of nitrogen through heat exchanger 950 is stopped, and replaced by a flow of water from water source 940, thus completing one predetermined cycle. In this embodiment, extraction point 110 is placed so that its radius of vacuum influence touches at least part of the radius of injection influence of injection point 910. The pressure gradient between low pressure extraction point no and high pressure injection point 910 draws injected media from injection point 910 towards extraction point no, whereby the heat of the injected media is transferred to the VOC source along this pathway. Artisans will appreciate the many diverse possible arrangements of multiple injection points and extraction points for creating pressure gradients that maximize VOC removal for any given set of VOC source parameters.

Artisans will also appreciate that the cycling between different gases may beneficially control the biological attenuation rates of VOCs. Artisans will also appreciate that the cycling between different injection media is not required. For example, the constant injection of either oxygen or ozone into the groundwater may be the preferred strategy for removing VOCs through an in situ air stripping of the groundwater. When in situ soil heating to desorb VOCs is of primary concern, artisans may select a constant injection of water steam gas to maximize heat transfer into certain soil types. Those skilled in the art will readily be able to select and appreciate optimal injection media or combinations of media under any given set of VOC source parameters.

While the method and apparatus have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated however, as to each of the above, to the extent that such information or statements incorporated by reference might be considered inconsistent with the patenting of this/these invention(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. In an enhanced process using a VOC removal device, the improvement comprising, in combination:

extracting at least one off-gas stream from an off-gas source;

compressing the extracted off-gas stream;

cooling the compressed off-gas stream to condense and remove water and pollutants from the off-gas stream;

using a first separation module, to separate pollutants from the off-gas stream by adsorbing pollutants in a separation module to produce an output air that is pollutant free, and then desorbing pollutants from the separation module and routing said desorbed pollutants to a previous step in the process;

separating desorbed pollutants from the pollutant free gas in the separation module and routing separated pollutants to a previous step in the process;

further comprising using a second separation module, to separate gas varieties from pollutant-free gas by at least one of adsorbing a first gas in a separation module to produce an output air that is substantially free of said first gas; and, desorbing first gas from the separation module; and, separating a first gas from other gases in a separation module;

further comprising using a third separation module, to separate gas varieties from pollutant free gas by at least one of adsorbing a second gas in a separation module to produce an output air that is substantially free of said second gas; and, desorbing second gas from the separation module; and, separating a second gas from other gases in a separation module;

further comprising the step of creating ozone gas from an oxygen gas feed; and, after cooling, reheating the off-gas to a temperature above approximately 0 degrees F. prior to entering a first separation module.

2. In an enhanced process using a VOC removal device, the improvement comprising, in combination:
    extracting at least one off-gas stream from an off-gas source;
    compressing the extracted off-gas stream;
    cooling the compressed off-gas stream to condense and remove water and pollutants from the off-gas stream;
    using a first separation module, to separate pollutants from the off-gas stream by adsorbing pollutants in a separation module to produce an output air that is pollutant free, and then desorbing pollutants from the separation module and routing said desorbed pollutants to a previous step in the process;
    separating desorbed pollutants from the pollutant free gas in the separation module and routing separated pollutants to a previous step in the process;
    further comprising using a second separation module, to separate gas varieties from pollutant-free gas by at least one of adsorbing a first gas in a separation module to produce an output air that is substantially free of said first gas; and,
    desorbing first gas from the separation module; and,
    separating a first gas from other gases in a separation module;
    further comprising using a third separation module, to separate gas varieties from pollutant free gas by at least one of adsorbing a second gas in a separation module to produce an output air that is substantially free of said second gas; and,
    desorbing second gas from the separation module; and,
    separating a second gas trout other gases in a separation module;
    further comprising heating at least one media using at least one source of "waste hat" created by the VOC removal system (to above about approximately 50° C.).

3. In an enhanced process using a VOC removal device, the improvement comprising, in combination:
    extracting at least one off-gas stream from an off-gas source;
    compressing the extracted off-gas stream;
    cooling the compressed off-gas stream to condense and remove water and pollutants from the off-gas stream;
    using a first separation module, to separate pollutants from the off-gas stream by adsorbing pollutants in a separation module to produce an output air that is pollutant free, and then desorbing pollutants from the separation module and routing said desorbed pollutants to a previous step in the process;
    separating desorbed pollutants from the pollutant free gas in the separation module and routing separated pollutants to a previous step in the process;
    further comprising using a second separation module, to separate gas varieties from pollutant-free gas by at least one of adsorbing a first gas in a separation module to produce an output air that is substantially free of said first gas; and,
    desorbing first gas from the separation module; and,
    separating a first gas from other gases in a separation module;
    further comprising using a third separation module, to separate gas varieties from pollutant free gas by at least one of adsorbing a second gas in a separation module to produce an output air that is substantially free of said second gas; and,
    desorbing second gas from the separation module; and,
    separating a second gas from other gases in a separation module;
    further comprising heating at least one media using at least one source of "waste hat" created by the VOC removal system (to above about approximately 50° C.);
    wherein each of the gas from the first separation module, second separation module, third separation module, atmosphere gas (air), water and steam of water is media.

4. In an enhanced process using a VOC removal device, the improvement comprising, in combination:
    extracting at least one off-gas stream from an off-gas source;
    compressing the extracted off-gas stream:
    cooling the compressed off-gas stream to condense and remove water and pollutants from the off-gas stream;
    using a first separation module, to separate pollutants from the off-gas stream by adsorbing pollutants in a separation module to produce an output air that is pollutant free, and then desorbing pollutants from the separation module and routing said desorbed pollutants to a previous step in the process;
    separating desorbed pollutants from the pollutant free gas in the separation module and routing separated pollutants to a previous step in the process;
    further comprising using a second separation module, to separate gas varieties from pollutant-free gas by at least one of adsorbing a first gas in a separation module to produce an output air that is substantially free of said first gas; and,
    desorbing first gas from the separation module; and,
    separating a first gas from other gases in a separation module;
    further comprising using a third separation module, to separate gas varieties from pollutant free gas by at least one of adsorbing a second gas in a separation module to produce an output air that is substantially free of said second gas; and,
    desorbing second gas from the separation module; and,
    separating a second gas from other gases in a separation module;
    further comprising heating at least one media using at least one source of "waste hat" created by the VOC removal system (to above about approximately 50° C.);
    wherein each of the gas from the first separation module, second separation module, third separation module, atmosphere gas (air), water and steam of water is media;
    further comprising harvesting excess thermal energy or "waste heat".

5. In an enhanced process using a VOC removal device, the improvement comprising, in combination:
    extracting at least one off-gas stream from an off-gas source;
    compressing the extracted off-gas stream;
    cooling the compressed off-gas stream to condense and remove water and pollutants from the off-gas stream;
    using a first separation module, to separate pollutants from the off-gas stream by adsorbing pollutants in a separation module to produce an output air that is pollutant free, and then desorbing pollutants from the separation module and routing said desorbed pollutants to a previous step in the process;
    separating described pollutants from the pollutant free gas in the separation module and routing separated pollutants to a previous step in the process;
    further comprising using a second separation module, to separate gas varieties from pollutant-free gas by at least one of adsorbing a first gas in a separation module to produce an output air that is substantially free of said first gas; and, desorbing first gas from the separation module; and, separating a first gas from other gases in a separation module;

further comprising using a third separation module, to separate gas varieties from pollutant free gas by at least one of adsorbing a second gas in a separation module to produce an output air that is substantially free of said second gas; and, desorbing second gas from the separation module; and, separating a second gas from other gases in a separation module;

further comprising heating at least one media using at least one source of "waste hat" created by the VOC removal system to above about approximately 50° C.);

wherein each of the gas from the first separation module, second separation module, third separation module, atmosphere gas (air), water and steam of water is media;

further comprising harvesting excess thermal energy or "waste heat";

wherein media is heated by a source of waste heat created by the VOC removal system.

6. In an enhanced process using a VOC removal device, the improvement comprising, in combination:

extracting at least one off-gas stream from an off-gas source;

compressing the extracted off-gas stream;

cooling the compressed off-gas stream to condense and remove water and pollutants from the off-gas stream;

using a first separation module, to separate pollutants from the off-gas stream by adsorbing pollutants in a separation module to produce an output air that is pollutant free, and then desorbing pollutants from the separation module and routing said desorbed pollutants to a previous step in the process;

separating desorbed pollutants from the pollutant free gas in the separation module and routing separated pollutants to a previous step in the process;

further comprising using a second separation module, to separate gas varieties from pollutant-free gas by at least one of adsorbing a first gas in a separation module to produce an output air that is substantially free of said first gas; and, desorbing first gas from the separation module; and, separating a first gas from other gases in a separation module;

further comprising using a third separation module, to separate gas varieties from pollutant free gas by at least one of adsorbing a second gas in a separation module to produce an output air that is substantially free of said second gas; and, desorbing second gas from the separation module; and, separating a second gas from other gases in a separation module;

further comprising heating at least one media using at least one source of "waste hat" created by the VOC removal system (to above about approximately 50° C.)

wherein each of the gas from the first separation module, second separation module, third separation module, atmosphere gas (air), water and steam of water is media;

further comprising harvesting excess thermal energy or "waste heat";

wherein media is heated by a source of waste heat created by the VOC removal system;

further comprising injecting at least one heated media into at least one VOC/pollutant source area to thermally enhance the in situ desorption or degradation of volatile organic compounds/pollutants.

7. In an enhanced process using a VOC removal device, the improvement comprising, in combination:

extracting at least one off-gas stream from an off-gas source;

compressing the extracted off-gas stream;

cooling the compressed off-gas stream to condense and remove water and pollutants from the off-gas stream;

using a first separation module, to separate pollutants from the off-gas stream by adsorbing pollutants in a separation module to produce an output air that is pollutant free, and then desorbing pollutants from the separation module and routing said desorbed pollutants to a previous step in the process;

separating desorbed pollutants from the pollutant free gas in the separation module and routing separated pollutants to a previous step in the process;

further comprising using a second separation module, to separate gas varieties from pollutant-free gas by at least one of adsorbing a first gas in as separation module to produce an output air that is substantially free of said first gas: and, desorbing first gas from the separation module; and, separating a first gas from other gases in a separation module;

further comprising using a third separation module, to separate gas varieties from pollutant free gas by at least one of adsorbing a second gas in a separation module to produce an output air that is substantially free of said second gas; and, desorbing second gas from the separation module; and, separating a second gas from other gases in a separation module;

further comprising heating at least one media using at least one source of "waste hat" created by the VOC removal system (to above about approximately 50° C.);

wherein each of the gas from the first separation module, second separation module, third separation module, atmosphere gas (air), water and steam of water is media;

further comprising harvesting excess thermal energy or "waste heat";

wherein media is heated by a source of waste heat created by the VOC removal system;

further comprising injecting at least one heated media into at least one VOC/pollutant service area to thermally enhance the in situ desorption or degradation of volatile organic compounds/pollutants;

where at least one of soil and groundwater and one of the separation modules is the pollutant source area.

8. In an enhanced process using a VOC removal device, the improvement comprising, in combination:

extracting at least one off-gas stream from an off-gas source;

compressing the extracted off-gas stream;

cooling the compressed off-gas stream to condense and remove water and pollutants from the off-gas stream;

using a first separation module, to separate pollutants from the off-gas stream by adsorbing pollutants in a separation module to produce an output air that is pollutant free, and then desorbing pollutants from the separation module and routing said desorbed pollutants to a previous step in the process;

separating desorbed pollutants from the pollutant free gas in the separation module and routing separated pollutants to a previous step in the process;

further comprising using a second separation module, to separate gas varieties from pollutant-free gas by at least one of adsorbing a first gas in a separation module to produce an output air that is substantially free of said first gas; and, desorbing first gas from the separation module: and, separating a first gas from other gases in a separation module;

further comprising using a third separation module, to separate gas varieties from pollutant free gas by at least one of adsorbing a second gas in a separation module to produce an output air that is substantially free of said second gas; and, desorbing second gas from the separation module; and, separating a second gas from other gases in a separation module;

further comprising heating at least one media using at least one source of "waste hat" created by the VOC removal system (to above about approximately 50° C.);

wherein each of the gas from the first separation module, second separation module, third separation module, atmosphere gas (air), water and steam of water is media;

further comprising harvesting excess thermal energy or "waste heat";

wherein media is heated by a source of waste heat created by the VOC removal system;

further comprising injecting at least one heated media into at least one VOC/pollutant service area to thermally enhance the in situ desorption or degradation of volatile organic compounds/pollutants;

where at least one of the soil and groundwater and one of the separation modules is pollutant source area;

further comprising at least one of:

periodically varying the flow and/or vacuum of off gas extraction from the of gas source to prevent the formation of preferential pathways, thereby more evenly removing VOCs from the off gas source; and, periodically varying the flow and/or pressure of the discharge air, or one or several separated gases of the discharge air, injected into the off gas source to prevent the formation of preferential pathways, thereby more evenly removing VOCs from the off gas source.

9. In enhanced process using a VOC removal device, the improvement comprising, in combination:

extracting at least one off-gas stream from an off-gas source;

compressing the extracted off-gas stream;

cooling the compressed off-gas stream to condense and remove water and pollutants from the off-gas stream;

using a first separation module, to separate pollutants from the off-gas stream by adsorbing pollutants in a separation module to produce an output air that is pollutant free, and then desorbing pollutants from the separation module and routing said desorbed pollutants to a previous step in the process;

separating desorbed pollutants from the pollutant free gas in the separation module and routing separated pollutants to a previous step in the process;

further comprising using a second separation module, to separate gas varieties from pollutant-free gas by at least one of adsorbing a first gas in a separation module to produce an output air that is substantially free of said first gas; and, desorbing first gas from the separation module; and, separating a first gas from other gases in a separation module;

further comprising using a second separation module, to separate gas varieties from pollutant-free gas by at least one of adsorbing a first gas in a separation module to produce an output air that is substantially free of said first gas; and, desorbing first gas from the separation module; and, separating a first gas from other gases in a separation module;

further comprising using a third separation module, to separate gas varieties from pollutant free gas by at least one of adsorbing a second gas in a separation module to produce an output air that is substantially free of said second gas; and, desorbing second gas from the separation module; and, separating a second gas from other gases in a separation module;

further comprising heating at least one media using at least one source of "waste hat" created by the VOC removal system (to above about approximately 50° C.);

wherein each of the gas from the first separation module, second separation module, third separation module, atmosphere gas (air), water and steam of water is media;

further comprising harvesting excess thermal energy or "waste heat";

wherein media is heated by a source of waste heat created by the VOC removal system;

further comprising injecting at least one heated media into at least one VOC/pollutant service area to thermally enhance the in situ desorption or degradation of volatile organic compounds/pollutants;

where at least one of the soil and groundwater and one of the separation modules is pollutant source area;

further comprising at least one of:

periodically varying the flow and/or vacuum of off gas extraction from the of gas source to prevent the formation of preferential pathways, thereby more evenly removing VOCs from the of gas source; and, periodically varying the flow and/or pressure of the discharge air, or one or several separated gases of the discharge air, injected into the off gas source to prevent the formation of preferential pathways, thereby more evenly removing VOCs from the off gas source;

further comprising periodically varying the flow and/or pressure of the injected media into the off gas source to prevent the formation of preferential pathways, thereby more evenly removing VOCs from the off gas source.

\* \* \* \* \*